(12) United States Patent
Jacobs

(10) Patent No.: US 6,193,380 B1
(45) Date of Patent: Feb. 27, 2001

(54) VEHICLE BLIND SPOT MIRROR

(76) Inventor: Raymond A. Jacobs, 30181 Cheviot Hills Dr., Franklin, MI (US) 48023

( * ) Notice: Subject to any disclaimer, the term of this patent is extended or adjusted under 35 U.S.C. 154(b) by 0 days.

(21) Appl. No.: 09/294,579

(22) Filed: Apr. 20, 1999

(51) Int. Cl.[7] ............................. G02B 5/08; G02B 7/18; G08G 1/16
(52) U.S. Cl. .................. 359/843; 359/841; 340/903; 340/904
(58) Field of Search .................... 359/838, 841, 359/843–844, 871–877; 340/901, 903, 904

(56) References Cited

U.S. PATENT DOCUMENTS

| | | | | |
|---|---|---|---|---|
| 4,260,980 | * | 4/1981 | Bates ........................... | 340/904 |
| 4,694,295 | * | 9/1987 | Miller et al. .................. | 340/903 |
| 5,097,362 | * | 3/1992 | Lynas ........................... | 359/843 |
| 5,126,885 | * | 6/1992 | Gray ............................. | 359/841 |
| 5,132,851 | * | 7/1992 | Bomar et al. .................. | 359/843 |
| 5,325,096 | * | 6/1994 | Pakett .......................... | 342/70 |
| 5,424,952 | * | 6/1995 | Asayama ....................... | 364/443 |
| 5,737,136 | * | 4/1998 | Boggiatto ..................... | 359/843 |
| 5,745,310 | * | 4/1998 | Mathieu ........................ | 359/843 |
| 5,786,772 | * | 7/1998 | Schofield et al. ............. | 340/903 |
| 6,116,742 | * | 9/2000 | Ahn ............................. | 359/843 |

\* cited by examiner

Primary Examiner—Thong Nguyen

(57) ABSTRACT

An angularly adjustable side view mirror mounted upon a first vehicle is normally positioned to display to the driver reflections of the area at the side and rear of the vehicle. The mirror is temporarily angularly adjusted by a motor, out of its normal position into a temporary position which displays to the driver a following vehicle that is momentarily located in the first vehicle's side blind spot area. The motor angularly turns the mirror a predetermined amount from its pre-set normal position to its pre-determined temporary position and then back to its normal position in response to signals from a detector. The detector senses the presence of a following vehicle in the blind spot area and, consequently, activates the motor to move and hold the mirror in the temporary blind spot area viewing position while the vehicle is located therein.

14 Claims, 3 Drawing Sheets

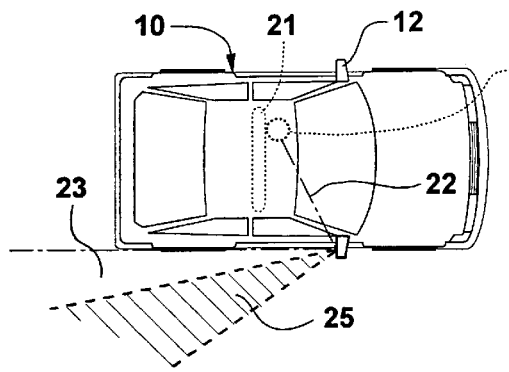
FIG - 1
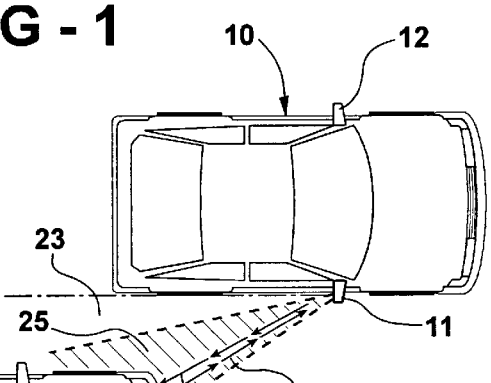
FIG - 2
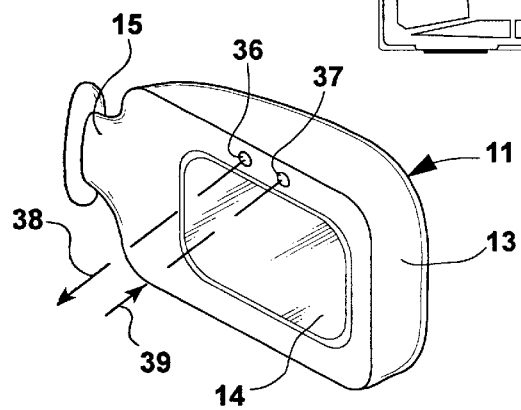
FIG - 3
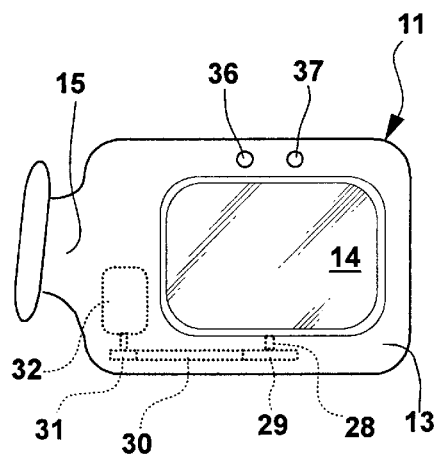
FIG - 4
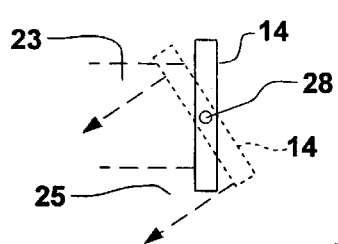
FIG - 5
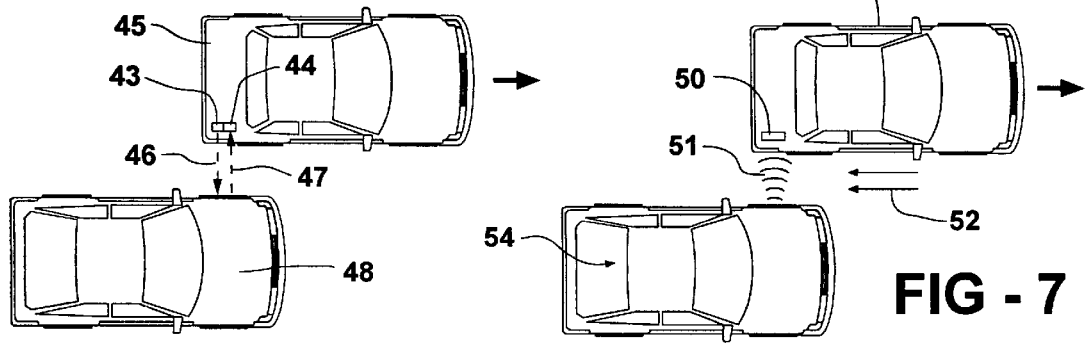
FIG - 6
FIG - 7

VEHICLE BLIND SPOT MIRROR

This invention relates to a side view automotive vehicle mirror which will automatically adjust its position to display a following vehicle located in the "blind spot" zone of a leading vehicle and then return, automatically, to its normal side-rear viewing position when the "blind spot" zone is clear.

BACKGROUND OF INVENTION

Automotive vehicles, such as passenger cars and trucks, conventionally have side view mirrors mounted on the sides of the vehicles to display to the driver images of the areas behind and to the sides of the vehicle. A conventional side view mirror comprises a support housing within which an adjustable angle mirror is mounted. The housing is connected to the vehicle in various known manners. The angularity of such mirrors can be adjusted by the vehicle driver either remotely, that is, from the driver's position behind the steering wheel of the vehicle, or directly, by direct hand pressure upon the mirror to move it within the housing.

Typically, the driver of a vehicle adjusts the angularity of the mirror so that the driver can view a reflected image of the respective side and rear area of the vehicle. Since the driver's position in a vehicle varies from one time to another because the driver may adjust the position of the vehicle seat upwardly or downwardly or forwardly and rearwardly, a mechanism for angularly adjusting the mirror is necessary in order to best display the reflected image desired by the driver.

Conventional, side view mirrors display a narrow angle and far distant side and rear area relative to the vehicle. Thus, there is normally a short distance area along the side of the vehicle which is commonly referred to as the "blind spot" or "blind spot" zone or area which is not ordinarily visible to the driver. In those instances where a following vehicle enters the blind spot area, the driver of the leading vehicle may not be aware of that condition. Because the following vehicle is not readily visible to the driver of the leading vehicle, the driver of the leading vehicle may inadvertently steer into the adjacent lane where the following vehicle is located or may veer towards the following vehicle a sufficient distance to collide with the following vehicle. Thus, accidents, involving collisions between a leading vehicle and a following vehicle located in the blind spot zone of the leading vehicle are common. At times, where the driver of the following vehicle was sufficiently alert, the following vehicle may have swerved away from the leading vehicle. That could have caused the following vehicle to run off the road or to collide with a another vehicle located on the opposite side of the following vehicle.

In the case of large trucks, frequently a separate, short range, wide angle, "blind spot" zone viewing mirror is mounted below or adjacent the normal side view mirror. Thus, the driver, has two mirrors to monitor in order to obtain both the normal side-rear view and a view of the vehicle's blind spot zone. However, that is somewhat distracting to the driver. Although separate "blind spot" or wide angle mirrors have been proposed for automobiles, the required sizes or size limitations on side view mirrors, in general, make these dual mirrors unpopular.

Thus, it would be desirable to have a dual view, side view mirror available for automotive vehicles, particularly passenger automobiles and other small size vehicles, which normally displays a normal side-rear image but which, when appropriate, will temporarily display a view of the blind spot zone to the vehicle driver. The invention herein is concerned with providing such a dual mirror which normally reflects the conventional narrow and long range side and rear view for a vehicle driver but, which will sense the presence of a following vehicle in the blind spot zone of a leading vehicle, and thereafter, will automatically adjust the angle of the mirror to momentarily display the presence of a following vehicle. When the following vehicle is no longer in the blind spot zone, the side view mirror will automatically return to its normal position.

SUMMARY OF INVENTION

This invention is concerned with a dual automotive side view mirror which normally displays a reflection of the side and rear areas relative to an automotive vehicle, but which will momentarily focus upon the blind spot zone when a following vehicle enters and is in that zone.

This invention contemplates providing a mirror assembly, with an appropriate detector and sensor system, which can be adjusted by the vehicle driver for ordinary side viewing during driving. However, it also can be pre-set to focus on the blind spot zone automatically when the detector senses a vehicle in that zone. Once the following vehicle leaves that zone the system reverts back to its earlier, ordinary driving position. To accomplish this, a suitable servo-motor is provided which adjusts the angularity of the mirror to enable the vehicle driver to pre-set the normal driving position of the mirror and to pre-set the temporary or blind spot focus position so that the motor automatically positions the mirror in one or the other of the pre-set positions. The pre-set positions are likely to vary for different drivers, depending upon the location of the driver relative to the side view mirror and the normal viewing angles of the driver. These positions may depend on the height of the driver or the position of the driver's eyes relative to the vehicle side view mirrors. Thus, the system requires adjustability for each particular driver.

An object of this invention is to provide a simplified system by which a side view mirror can be pre-set into a normal viewing position relative to a particular driver and, in addition, can be pre-set into a viewing position which reflects the blind spot of the vehicle. The system includes sensing signals or beams which will detect a vehicle in the blind spot and cause the mirror to automatically move to a position that displays the blind spot area and later return the mirror to its normal driving position.

Another object of this invention is to provide a system which can be added as a modification to a presently existing mirror control system or which can be separately made as an aftermarket or add-on system to control a mirror assembly mounted on a vehicle.

Yet another object of this invention is to provide a system which may be sufficiently versatile so as to use different kinds of sensing signals, such as microwave, laser, ultrasonic, air pressure or the like, depending which may be most economical and commercially effective for a particular installation.

These and other objects and advantages of this invention will become apparent upon reading the following description, of which the attached drawings form a part.

DESCRIPTION OF DRAWINGS

FIG. 1 schematically illustrates a plan view of an automobile and the side and rear areas that are viewed in a typical side view mirror;

FIG. 2 is a schematic, plan view of a leading vehicle and a following vehicle located in the blind spot zone or area of the leading vehicle and, further; schematically illustrates the emission and the return of sensing signals that detect the presence of the following vehicle in the blind spot zone;

FIG. 3 is a schematic, perspective view of a conventional mirror and housing with a signal emitter and receiver on the housing;

FIG. 4 is a schematic, elevational view showing a mirror and housing and a servo-motor arrangement for adjusting the angle of the mirror;

FIG. 5 schematically shows adjusting the angles of the mirror for normally viewing either the area located to the side and rear of the vehicle or alternatively viewing the blind spot zone of the vehicle;

FIG. 6 illustrates a plan, schematic illustration of a modification having the detection system mounted on the rear side of a vehicle rather than directly upon the mirror housing;

FIG. 7 is a plan, schematic view, illustrating another modification having an air pressure sensitive detector for providing the signal that a following vehicle is located in the blink spot zone of a lead vehicle;

DETAILED DESCRIPTION

Figure 8:
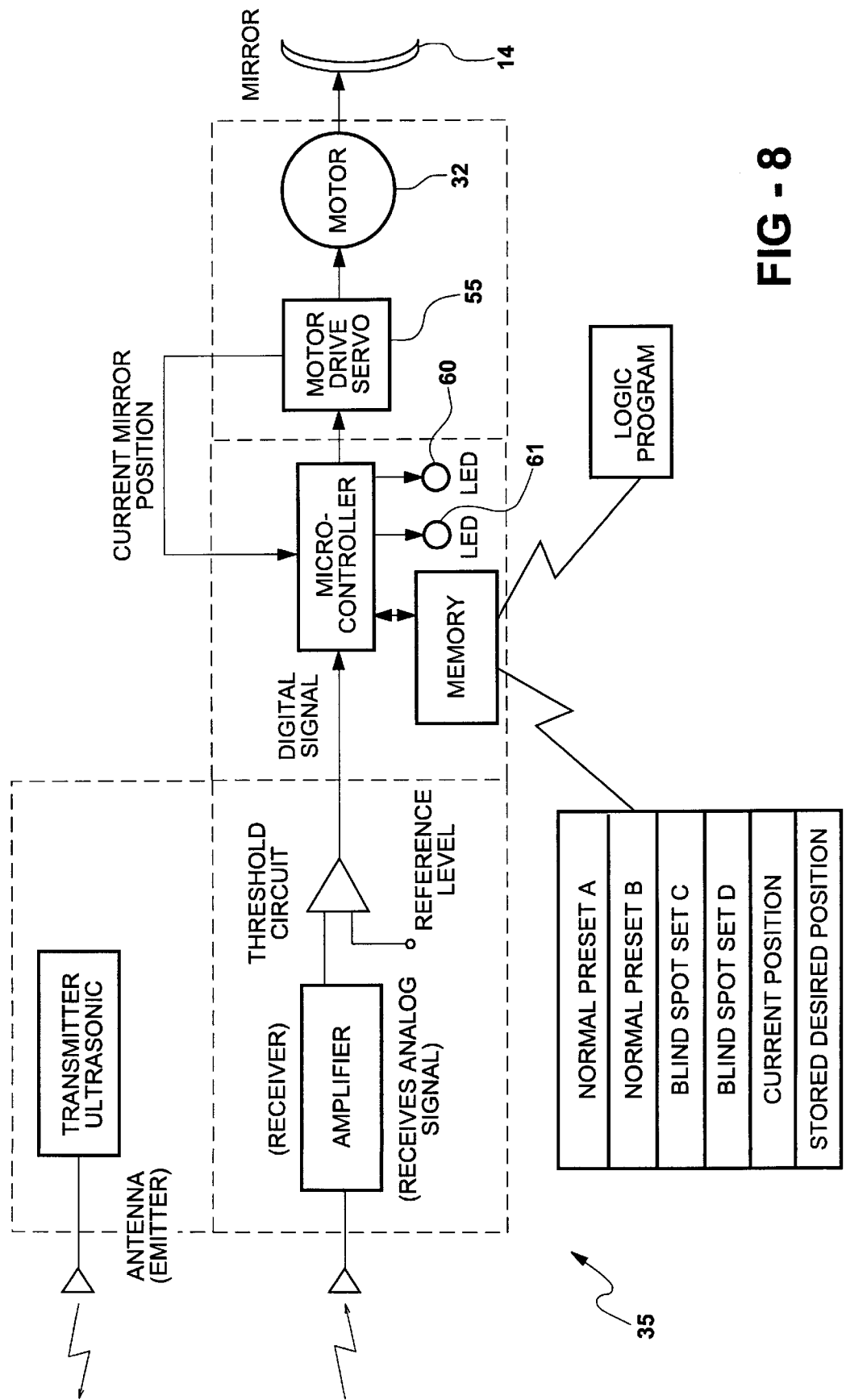
FIG. 8 is a schematic circuit diagram generally showing the circuit components which form a typical electronic circuit for accomplishing the automatic control of the mirror.

FIG. 1 schematically illustrates an automobile 10 having a right side mirror assembly 11 and a left side mirror assembly 12 mounted on the sides of the vehicle body. The mirror assemblies, in general, comprise a conventional mirror housing 13 which may be of different shapes and sizes. The housing supports an adjustable angle mirror 14. The housing may be connected to the automobile by a connection arm or part 15 (see FIG. 3). The particular size and shape of the mirror, its support housing, and the manner of which it is attached to the vehicle may vary considerably from vehicle to vehicle and forms no part of this invention.

FIG. 1 schematically shows a driver 20 seated upon a conventional adjustable height and position front seat 21 in the vehicle. A dotted line 22 schematically shows the line of sight of the driver to the right side mirror 11. In viewing the mirror, the driver would have a normal, view of the adjacent side area and the long distance rear area 23 relative to the vehicle. However, the driver would not have a view of the blind spot zone or area 25 which is laterally further away from the side of the vehicle. Thus, the purpose of the invention described herein is to provide the driver with a view of the blind spot area when needed.

The invention is described in connection with the right side view mirror 11. However, a similar construction and system is intended for the left side mirror 12, if desired. Thus, although this description is limited to the right side mirror, it equally applies to the left side mirror of the vehicle.

As schematically illustrated in FIG. 4, the mirror 14 is attached to a spindle 28 which is rotatably mounted within the housing 13. The particular manner of mounting the mirror is conventional. Since it may vary considerably for different model vehicles and is not part of this invention, the mounting is shown schematically rather than in detail. Those skilled in the art would be able to select the particular mounting that is appropriate for the particular mirror assembly desired.

The spindle 28 is connected to a suitable gear 29 or pulley which, in turn, is connected by a gear or by an endless belt 30 to an output gear or pulley 31 of an electrical servo-motor 32 that is energized from the battery of the vehicle. Such motor drive systems are known for vehicles which are equipped to automatically adjust the normal angular positions of the side view mirrors to a pre-set position when a particular driver enters the vehicle. In those systems, when the driver enters the vehicle and is seated, a signal indicates the presence of that particular driver. That automatically causes the mirror to turn to or adjust to a pre-set position for normal rear-side view purposes.

As mentioned above, the present system initially detects the presence of a following vehicle in the blind spot zone. Then through an appropriate electronic or electrical control circuit, the system automatically causes the mirror to adjust to an angle that permits the driver to view the following vehicle while it is in the blind spot zone. After that, the detector signals the absence of the following vehicle from the blind spot zone and the mirror automatically is returned by the servo-motor to the original, normal side view position. FIG. 8 schematically illustrates a circuit 35 which operates for that purpose.

FIGS. 3 and 4 schematically show a sensor signal beam emitter 36 and a signal receiver 37 that are mounted on the housing 13. Since the housing does not move relative to the vehicle, the sensor emits a sensing signal beam 38 which overlaps a relatively short zone or area along the side of the vehicle. The beam dissipates after passing through the blind spot zone. If the beam contacts a following vehicle 40 in the blind spot zone, a reflected beam 39 returns to the receiver 37 to activate the circuit 35 which will re-position the mirror for focusing on the blind spot zone.

FIG. 6 schematically illustrates a modification in which a detector sensor 43 and receiver are mounted on the side of the vehicle body 45, such as in the trunk or over the trunk lid of the vehicle rather than in the mirror housing. In that case, the sensor emits an outwardly, transversely directed, signal beam 46 which, if it strikes a vehicle 48 in the blind spot zone, results in a reflected return beam 47 directed to the receiver 44. Various types of commercially available sensors with emitters and receivers can be selected by those skilled in the art for use for the purpose intended here.

FIG. 7 schematically illustrates another modification in which the detector 50 may be in the form of an air pressure sensitive sensor which will sense changes in air pressure (schematically indicated by wavy lines 52) due to the air flow (schematically indicated by arrows 51) between the leading vehicle 53 and the adjacent following vehicle 54 that is located in the blind spot zone. The pressure change between normal air pressure and the air pressure when the vehicles overlap acts as an input signal to the detection circuit. Sensitive air pressure sensing devices are commercially available and one skilled in the art would be able to select an appropriate one for this purpose.

Figure 9:
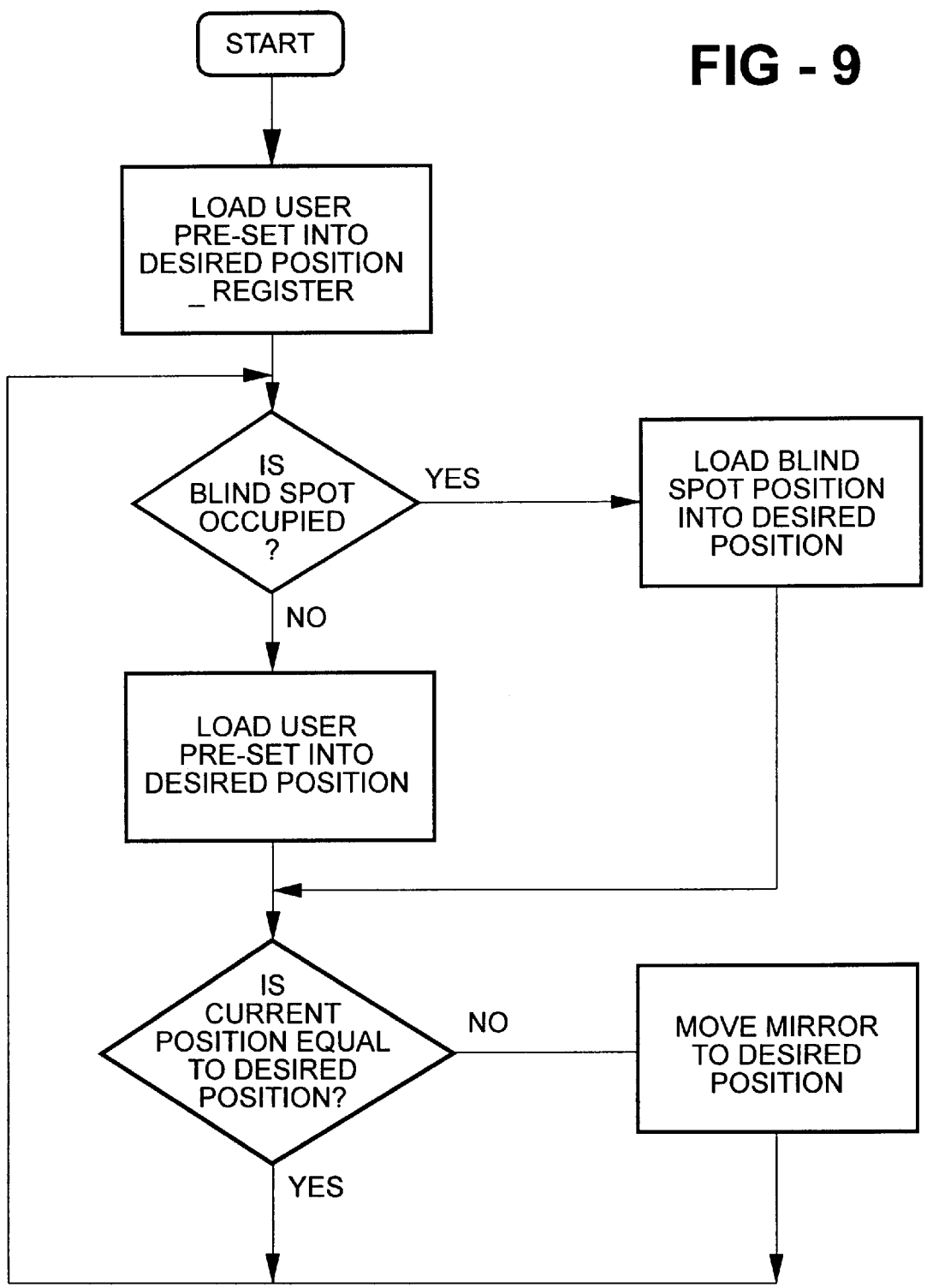
FIG. 9 is a schematic, logic diagram illustrating the steps in the start-up of the mirror control system.

FIG. 8 schematically illustrates an electronic control circuit. FIG. 9 illustrates the logic or steps for the driver to pre-set the circuit so that the mirror can be either in the normal side view position or in the pre-determined blind spot view position.

The mirror control circuit illustrated in FIG. 8 utilizes a microwave signal for detecting a vehicle located in the blind spot of a leading vehicle. The circuit has an emitter or antenna which transmits a microwave beam or signal from a transmitter. If the beam, which is set for a short distance, does not detect an object in the blind spot zone, nothing further happens. However, when the beam is reflected back from a vehicle in the blind spot zone, the reflected beam is picked up by a receiver or antenna and transmitted to an amplifier. At that point, the amplifier receives an analog signal which it transmits to a threshold circuit which compares the signal that is received to a reference level (schematically indicated). If the received signal is at a sufficient threshold level, the circuit transmits the signal, which is converted into a digital signal, to a microcontroller. That, in turn, signals the servo-motor driver 55 which actuates the motor 32 to turn the mirror 14. The servo-motor driver determines and sends back to the microcontroller data locating the current mirror position before actuating the motor. In addition, the microcontroller receives from a memory circuit data about the pre-set normal position or positions A and B, if there are more than one, of the particular driver or drivers as well as data concerning the pre-set blind spot setting or settings C and D of the particular driver. The memory circuit is schematically illustrated at the logic program (in FIG. 8) contained within the memory. These pre-set positions are determined by the driver. In addition, variable position information concerning the current position of the mirror and the desired position are supplied to the microcontroller.

In essence, the threshold circuit answers the question as to whether there is or is not a vehicle in the blind spot zone. If there is not, the remainder of the circuit is dormant. If there is, the circuit is actuated as indicated above to re-set the position of the mirror as indicated.

The sensing signal that is emitted is preferably a microwave signal, referred to as a radar signal. However, other detection signals and known detection techniques can be used depending upon the cost, commercial availability of components and the like. Thus, the detection signal could be in the form of an ultrasonic beam, or infrared signals or a laser beam or sonar type of sound wave or other known signaling systems. The schematic circuit diagram illustrated in FIG. 8 is intended to refer to each of these various types of signals. Moreover, as mentioned above, the circuit could be used with commercially available mirror adjustment systems which automatically adjust the mirror to the pre-set viewing positions for a particular driver. In those systems, the circuit and parts needed to automatically move the mirror to or from viewing the blind spot zone and the initial normal positions can be added.

An alarm device, for example, in the form of an LED light 60 connected to the microcontroller, can be positioned on, or mounted within the dash board, of the vehicle in front of the driver. The light can be actuated to visually alert the driver to the presence of a vehicle in the blind spot. In addition, or alternatively, a conventional sound producing device 61 can be connected to the microcontroller to audibly alert the driver.

FIG. 9 schematically illustrates the steps in pre-setting the system for use. At the start the driver re-sets the mirror into the desired blind spot viewing position which is registered in the memory. Then, the driver determines whether the blind spot is occupied or not. If it is not occupied, the mirror is pre-set into the desired position. If that position, is determined to be the current position of the mirror, no further act by the driver is required.

If the blind spot is occupied, the blind spot position is loaded into the desired position for the particular driver and the system determines whether the current position equals that blind spot desired position. If not, the mirror is moved to the desired position. Now, the mirror should have a normal position for the particular driver and a blind spot viewing position for that same particular driver. The normal and blind spot viewing positions may vary from one driver to another. Also the positions may vary if a particular driver moves the vehicle seat either rearwardly or forwardly or up and down. Consequently, the driver may have to re-set the normal and blind spot viewing positions from time to time.

This invention may be further developed within the scope of the following claims. Therefore, it is desired that the foregoing description be merely descriptive of an operative embodiment of this invention and not in a strictly limiting sense. Having fully described at least one operative embodiment of this invention, I now claim:

1. A vehicle blind spot viewing mirror comprising:

a mirror turnably mounted within a support housing formed for attachment to a side of a first vehicle, with said mirror being angularly adjustable by a vehicle driver into a normal viewing position for normally displaying to the vehicle driver reflections of a blind spot area located rearwardly and to a side of the first vehicle;

a motor connected to the mirror for turning and angularly adjusting the mirror so as to angularly adjust the mirror relative to the driver to a temporary viewing position for reflecting an image of the blind spot area of the first vehicle;

a detector system mounted on the vehicle and including a sensor which senses a momentary presence of a following vehicle in the side blind spot area of the first vehicle;

said detector system emitting a first motor actuating signal upon sensing said following vehicle in the blind spot area for causing the motor to angularly turn the mirror from its normal viewing position to said temporary viewing position which displays to the driver a reflection of the following vehicle occupying the blind spot area;

and said detector system emitting a second motor activating signal to the motor to cause the motor to angularly return the mirror to its normal viewing position after the detector system senses that the following vehicle is no longer in the blind spot area of the first vehicle.

2. A vehicle blind spot viewing mirror as set forth in claim 1 and including said detector system comprising a sensing signal emitter for emitting a sensing beam and a sensing signal receiver for receiving a return reflection of the emitted sensing beam with said sensing beam being focused into the blind spot area of the first vehicle for contacting a following vehicle located in that blind spot area and reflecting the sensing beam back to the receiver and, in the absence of a vehicle in the blind spot area, said sensing beam dissipating beyond said predetermined blind spot area.

3. A vehicle blind spot viewing mirror as set forth in claim 2, and said signal beam being selected from a conventional type article sensing signal selected from a group comprising of an infrared light beam, an ultra-sonic type beam, a sonartype beam, a radar type beam or a laser beam, which signal beam is substantially continuously directed into the side blind spot area of the first vehicle.

4. A vehicle blind spot viewing mirror as set forth in claim 3, and said mirror being operable by the vehicle driver to turn the mirror into a normal, rear viewing position and, alternatively, into a blind spot area viewing position;

and said detector including a memory device for establishing each such position, and said detection system including a control for said motor to cause the motor to automatically return to the temporary or normal positions from the opposite position when signaled by a detection signal indicating the presence or absence of the following vehicle in the blind spot area.

5. A vehicle blind spot viewing mirror as set forth in claim 4, including said sensor being mounted upon a side portion of the body of the first vehicle and directing its emitted detection signal generally transversely outwardly of the first vehicle towards a following vehicle which is at least partially along side of the first vehicle in the blind spot of the first vehicle.

6. A vehicle blind spot viewing mirror as set forth in claim 4, and including said sensor being mounted in the mirror support housing and normally directing its signal rearwardly along the side of the first vehicle into the blind spot of the first vehicle and detecting forwardly directed reflections of said detecting signal received from a vehicle in the area of the blind spot of the first vehicle.

7. A vehicle blind spot viewing mirror as set forth in claim 4, and including said sensor having an air pressure measuring device included therein for sensing changes in air pressure along the side of the first vehicle at the blind spot area and, thereby, detecting the presence of a following vehicle in the blind spot of the first vehicle by measuring predetermined changes in the air pressure between the two vehicles.

8. A vehicle blind spot viewing mirror as set forth in claim 4, and including a driver alarm device located within the first vehicle, with said alarm device displaying an alarm signal to the driver when the detector system senses a following vehicle in the blind spot area of the first vehicle.

9. A vehicle blind spot viewing mirror as set forth in claim 8, and including said signal device comprising a lamp connected to the detector system and displaying a visible light to the drives in response to the sensor detecting a vehicle in said blind spot area.

10. A vehicle blind spot viewing mirror as defined in claim 8 and said alarm device comprising an audible sound emitter connected to the detector.

11. A side view mirror for a vehicle having a mirror moveably mounted upon a housing for angular adjustment by a vehicle driver for viewing a side rear area of a first vehicle, with said mirror being self-adjustable temporarily into a position which displays to the driver a following vehicle which is momentarily in a blind spot area of the first vehicle, comprising;

a detector system which includes a sensor which emits a sensor signal beam rearwardly along the side of the vehicle and a receiver which detects reflections of that signal beam bounced off a following vehicle which is momentarily in the blind spot area of the first vehicle and which actuates a motor operatively connected to the mirror for turning the mirror to an angle which displays a reflection of the following vehicle to the driver;

said detection system including a memory device which remembers an initial viewing position of the mirror and an angular position in which the mirror reflects the following vehicle located in the blind spot area and which limits the movement of the mirror to such positions when turned by the motor;

whereby the driver of the first vehicle pre-sets the initial position of the mirror for normal side and rear view visibility and pre-sets the angular position of the mirror for displaying a following vehicle in the blind spot area when detected by the sensor;

with said sensor signal beam being of an intensity to dissipate beyond the vehicle blind spot area.

12. A mirror as defined in claim 11 and including the sensor signal being selected from one of a laser beam, ultra-sonic type beam, infrared light beam, sonar type beam which beam is focused into the side blind spot area of the first vehicle.

13. A mirror as defined in claim 12 and including said sensor being positioned on a mirror housing and substantially continuously emitting a detection signal beam focused into the side blind spot area of the first vehicle notwithstanding changes in position of the mirror.

14. A side view mirror for a vehicle having a mirror moveably mounted upon a housing for angular adjustment by a vehicle driver for viewing a side rear area of a first vehicle, with said mirror being self-adjustable temporarily into a position which displays to the driver a following vehicle which is momentarily in a blind spot area of the first vehicle, comprising;

a detector system which includes a sensor which emits a sensor signal beam transverse to the side of the vehicle and a receiver which detects reflections of that signal beam bounced off a following vehicle which is momentarily in the blind spot area of the first vehicle and which actuates a motor operatively connected to the mirror for turning the mirror to an angle which displays a reflection of the following vehicle to the driver;

said detection system including a memory device which remembers an initial viewing position of the mirror and an angular position in which the mirror reflects the following vehicle located in the blind spot area and which limits the movement of the mirror to such positions when turned by the motor;

whereby the driver of the first vehicle pre-sets the initial position of the mirror for normal side and rear view visibility and pre-sets the angular position of the mirror for displaying a following vehicle in the blind spot area when detected by the sensor;

with said sensor signal beam being of an intensity to dissipate beyond the vehicle blind spot area.

* * * * *